(12) United States Patent
Shim

(10) Patent No.: US 8,632,728 B2
(45) Date of Patent: Jan. 21, 2014

(54) ULTRAVIOLET STERILIZER FOR WATER PIPE AND WATER WAY TYPE

(71) Applicant: Jong Seop Shim, Gwangju-si (KR)

(72) Inventor: Jong Seop Shim, Gwangju-si (KR)

( * ) Notice: Subject to any disclaimer, the term of this patent is extended or adjusted under 35 U.S.C. 154(b) by 0 days.

(21) Appl. No.: 13/685,662

(22) Filed: Nov. 26, 2012

(65) Prior Publication Data

US 2013/0156654 A1    Jun. 20, 2013

(30) Foreign Application Priority Data

Nov. 25, 2011   (KR) .................. 10-2011-0124664

(51) Int. Cl.
*B01J 19/08*   (2006.01)
*G01N 23/12*   (2006.01)

(52) U.S. Cl.
USPC ................................. 422/186.3; 250/436

(58) Field of Classification Search
USPC ..................................... 422/186.3; 250/436
See application file for complete search history.

(56) References Cited

U.S. PATENT DOCUMENTS 4,825,083 A * 4/1989 Latel et al. .............. 250/436

FOREIGN PATENT DOCUMENTS

| KR | 0295112 | 11/2002 |
|---|---|---|
| KR | 10-2004-0056940 | 7/2004 |
| KR | 10-0453740 | 10/2004 |
| KR | 10-0924392 | 10/2009 |

\* cited by examiner

*Primary Examiner* — Kishor Mayekar
(74) *Attorney, Agent, or Firm* — Christopher Paul Mitchell

(57) ABSTRACT

An ultraviolet ray sterilizer for a water pipe and a waterway featuring a plurality of circular flow ways that are formed, and an ultraviolet lamp is provided at the center of the flow ways, thus removing a sterilization dead zone where sterilization is not performed.

4 Claims, 9 Drawing Sheets

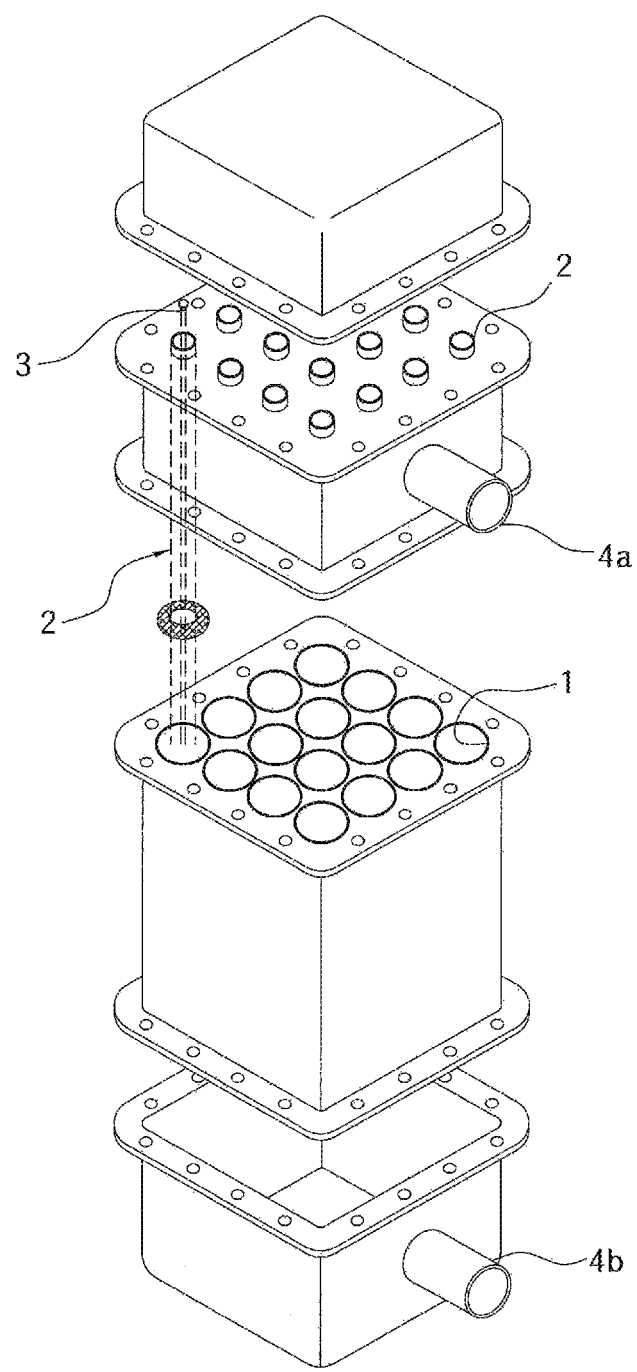
Fig. 1a [Prior Art]

Fig. 1b [Prior Art]
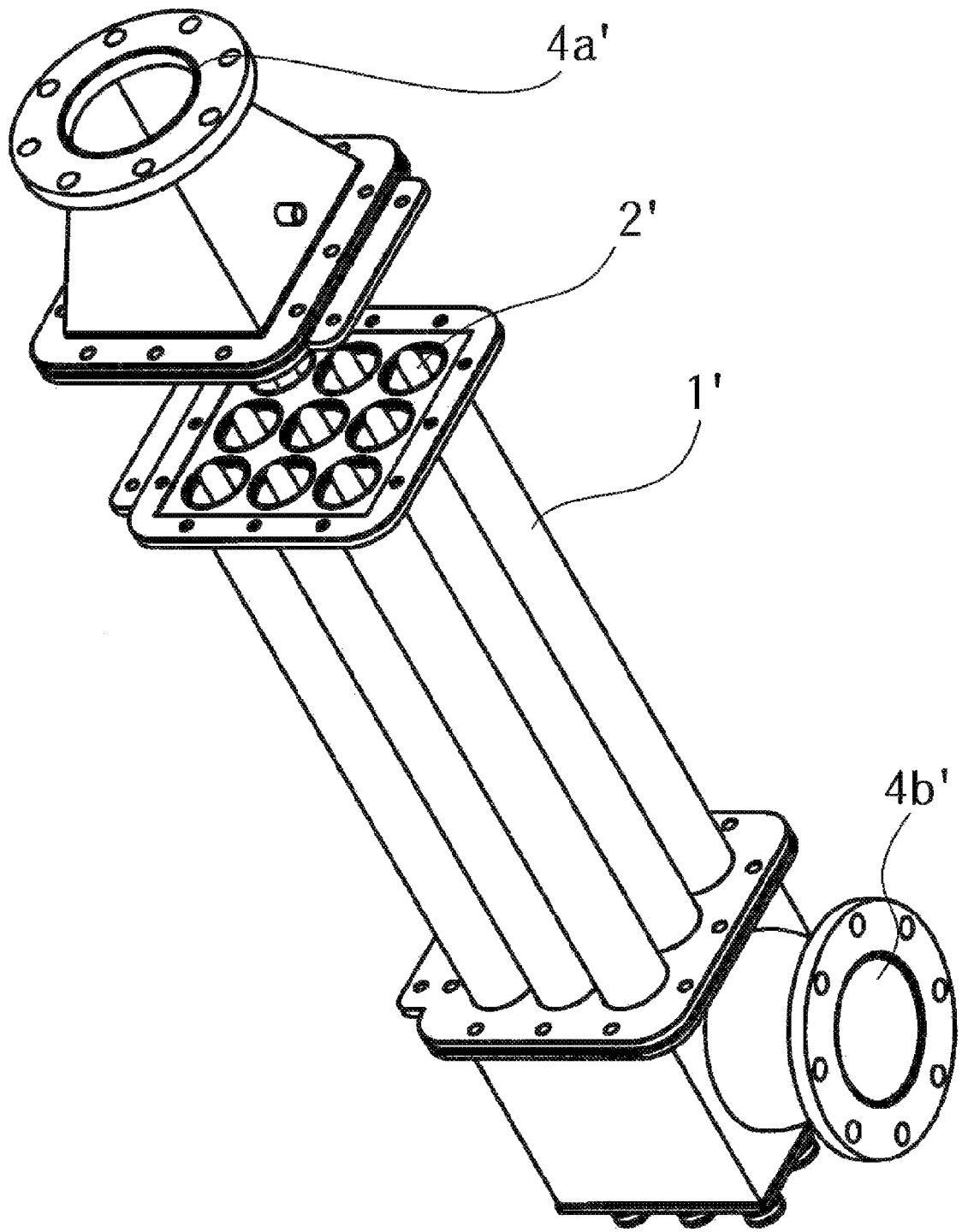

Fig. 2 [Prior Art]
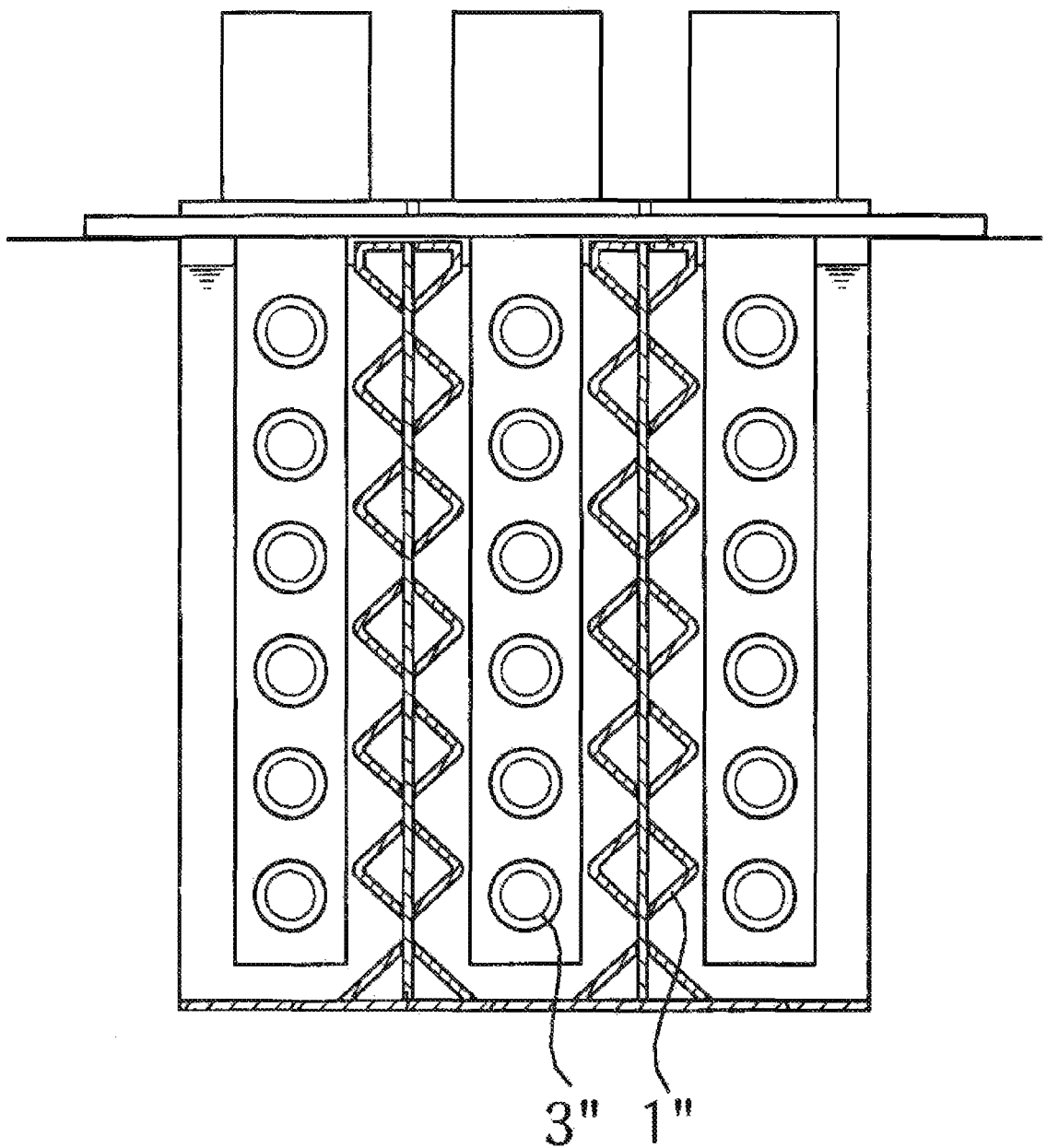

ULTRAVIOLET STERILIZER FOR WATER PIPE AND WATER WAY TYPE

RELATED APPLICATION

The present application claims priority from Korean Patent Application No. 10-2011-0124664 filed Nov. 25, 2011 in the Korean Intellectual Property Office, which is hereby incorporated by reference in its entirety.

TECHNICAL FIELD

The present invention relates to an ultraviolet ray sterilizer for a water pipe and a waterway, and in particular to an ultraviolet ray sterilizer coated with a photo catalyst for a water pipe and a waterway featuring a plurality of circular flow ways that are formed, and an ultraviolet lamp is provided at the center of the flow ways, thus removing a sterilization dead zone.

BACKGROUND ART

Various viruses such as microorganisms included in sewage are generally sterilized before the sewage in a sewage processing plant is discharged into a river. The sterilization methods include a chlorine sterilization method, an ultraviolet ray sterilization method and an ozone sterilization method. The ultraviolet ray sterilization method is directed to inactivating microorganisms by destroying the structures of microorganisms by radiating ultraviolet rays. The sterilization can be performed by radiating only a few seconds at a proper radiation level, so it is assumed as an environment friendly method.

The ultraviolet ray sterilizer installed at a waterway or a water pipe of a conventional sewage process plant is characterized in that a plurality of ultraviolet ray lamps are horizontally or vertically installed with respect to the direction of water flow at regular intervals in the upward, downward, leftward and rightward directions. So, the harmful microorganism in the treatment water is sterilized and removed by radiating ultraviolet rays to the treatment water flowing near the ultraviolet ray lamps.

The conventional ultraviolet ray sterilizer is characterized in that a cylindrical ultraviolet ray lamp of a diameter of 15-30 mm that is protected in a crystal tube and is installed underwater, so the ultraviolet rays are radiated from the ultraviolet ray lamps, thus sterilizing the microorganisms in the region where the ultraviolet rays are transmitted. However, there is a problem in that the ultraviolet rays don't reach the regions where the ultraviolet rays don't transmit, thus making non-sterilization zones where viruses are not sterilized. So as to resolve the above mentioned problems, as shown in FIG. 1a, Korean patent registration number 0924392 discloses an "ULTRAVIOLET STERILIZATION AND PURIFICATION APPARATUS EXCLUDING DEAD ZONE OF ULTRAVIOLET RADIATION". The sterilization apparatus as shown in FIG. 1a is characterized in that a crystal tube 2 into which is inserted an ultraviolet ray lamp 3 that is positioned in the cylindrical tube 1, thus removing the ultraviolet ray radiation dead zones where the sterilization is not performed due to ultraviolet rays that don't reach. However, the above-mentioned invention is constituted in a structure in which each ultraviolet ray lamp 3 is inserted into the cylindrical tube 1 in a longitudinal direction, so the construction is complicated. When it is necessary to exchange and clean each ultraviolet ray lamp 3, it is necessary to attach or detach one by one the ultraviolet ray lamps 3. Since it is necessary to be connected to a water pipe when in use, the inlet and outlet 4a and 4b should be twisted at an angle of 90° or 180° with respect to the existing water pipe direction when connecting to the water pipe. In addition, since the above mentioned invention is characterized in that the ultraviolet ray lamp 3 being inserted in a longitudinal direction of the cylindrical tube 1, it cannot be installed at the open type water way. FIG. 1b is a view showing a structure in which a crystal tube 2' is inserted into the cylindrical tube 1' in the longitudinal direction of the tube 1' like in the invention as shown in FIG. 1a. For this reason, the inlet and output 4a and 4b of the invention as shown in FIG. 1b can be twisted at an angle of 90° and can be connected to the water pipe; however it cannot be installed in a water way the upper side of which is open.

In addition, as a technology which can be installed in an open type water way so as to remove the non-sterilization regions, as shown in FIG. 2, Korean utility model registration number 0295112 is characterized in that a reflection member 1" the surface of which is mirrored that is installed between the lamp 3" and the lamp, thus allowing the ultraviolet rays from the ultraviolet ray lamps to reach the non-sterilization regions. The above mentioned invention can be installed in an open water way and can partially remove the non-sterilization region where the ultraviolet rays don't reach, with the aid of the mirrored reflection member 1"; however the space between the ultraviolet ray lamps 3" and the apex portions of the diamond shape still form non-sterilization regions. Since the structure for the purpose of removing the dead zones of the ultraviolet ray radiations does not form a concentric circle in the diamond shape, the pressure loss in the flow way increases, and it is impossible to install the washing apparatus for the purpose of removing the contaminants such as moss and organic substances stuck to the surface of the crystal tube, so the contaminants come to block the ultraviolet rays, thus reducing sterilization power. The open type ultraviolet ray sterilizer is basically configured for the sake of the sterilization of the water in the sewage treatment plant in which the crystal tube is contaminated by moss or the like, so the above invention cannot be actually applied as an ultraviolet ray sterilizer.

In addition to the harmful microorganisms, micro organic substances or floating substances are contained underwater in the sewage treatment plant which flows in the ultraviolet ray radiation regions. Such substances might stick to the outer surface of the crystal tube protecting the ultraviolet ray lamp, thus forming an organic film thereon, so it comes to block the ultraviolet rays which radiate into the water by way of the crystal tubes by forming the organic film, so sterilization power might be reduced or such substances come to float around the crystal tube, thus narrowing the range of the ultraviolet ray radiation region. When the turbidity increases due to the floating substances contained in the treatment water, the ultraviolet rays radiated from the ultraviolet ray lamp don't reach far, and the organic substances might accumulate on the surface of the crystal tube thus forming a film thereon, so the radiation of the ultraviolet rays is greatly decreased from the ultraviolet ray lamps, and the sterilization of the microorganism is not fully performed.

In order to overcome the above mentioned problems in the conventional art, there is provided a machine type crystal tube washing apparatus in which a ring shaped wiper surrounding the outer side of the crystal tube configured to protect the ultraviolet ray lamp underwater is installed, and the wiper moves leftward and right ward in the longitudinal direction along the outer surface of the crystal tube thus washing the surface of the crystal tube. For an example, there is Korean patent registration number 0453740. The above mentioned machine type crystal tube washing apparatus adapts an air and hydraulic cylinder method in which a metallic wire brush matching with the outer diameter of the crystal tube or a Teflon material sleeve which makes abrasion against the contaminants stuck to the outer surface of the crystal tube so as to clean the outer surface of the crystal tube in the underwater way type ultraviolet ray sterilizer or adapts a method for removing contaminants by reciprocating the sleeve by means of the rotation of the shaft. The above mentioned methods have the problems in that as the crystal tube washing apparatus is used for a long time, the sleeves configured to remove the contaminants from the crystal tube become worn out or loosened or the washing efficiency of the crystal tube worsens due to the frequent errors of the parts belonging to the washing apparatus, so the contaminants might be stuck to the crystal tube, so the amount of the ultraviolet rays transmitting into the water by way of the crystal tube is decreased, thus still resulting in a lowered and weakened sterilization power.

There is an attempt to coat titanium dioxide on the crystal tube so as to actually adapt the automatic washing function for the sake of a crystal tube contamination prevention of the ultraviolet ray sterilizer, the automatic washing function originally configured to wash the contaminants from the outer wall of the building with the aid of the photolysis operation and to keep clean the outer wall of the same by using a super hydrophilicity and contaminant degradation power of the photo catalyst so as to overcome the problems encountered in the machine type crystal tube washing apparatus. Korean patent publication number 2004-0056940 discloses an ultraviolet ray sterilizer providing a sterilization and contaminant degradation operation by mixing the particle type photo catalyst with the binder and coating it on the outer surface of the crystal tube.

When the titanium dioxide is coated on the crystal tube of the ultraviolet ray sterilizer, the titanium dioxide absorbs ultraviolet rays and helps perform a photo catalyst reaction, so the ultraviolet rays from the ultraviolet ray lamps can be absorbed by the titanium dioxide coated on the outer surface of the crystal tube, thus producing OH-radicals. Therefore, the contaminants are prevented from sticking to the crystal tube with the aid of the photo crystal reaction which provides sterilization operation to the contaminants, while making sure that the microorganism of the surface of the crystal tube can be sterilized. In this case, most of the ultraviolet rays from the ultraviolet ray lamps are blocked by the titanium dioxide coated on the crystal tube, in other words, they are not radiated into the water, it is impossible to sterilize the microorganism with the aid of the ultraviolet rays. In this case the sterilization can be performed only by means of the OH-radicals produced on the surface of the titanium dioxide coated on the outer surface of the crystal tube, so the regions except for the surface of the titanium dioxide are not sterilized, so the sterilization is not properly performed, and it cannot be used as an ultraviolet ray sterilizer.

In particular, as disclosed in Korean publication number 2004-0056940, when the powder type photo catalyst is mixed with the inorganic binder and is heat-treated at about 100° and is coated, the inorganic binder not having a photo catalyst activation is inevitably coated on the surface of the photo catalyst while the powder type titanium dioxide photo catalyst is mixed with the silane inorganic binder and is coated on the surface of the crystal tube, so the contacts with the ultraviolet rays are blocked, not showing any activation. In addition, the binder configured to fix the photo catalyst is prevented from contacting with the contaminants or microorganism, so the photo catalyst reaction is reduced.

When the photo catalyst powder is coated, since it is impossible to obtain a photo catalyst coating layer smaller than the size of the photo catalyst particle, it is impossible to perform the ultraviolet ray sterilization operations while providing a contamination prevention function of the crystal tube by adjusting the thickness of the photo catalyst coating layer and the amount of the ultraviolet ray transmission due to the characteristics of the titanium dioxide having a good ultraviolet ray shielding effect. When using for long periods of time underwater, the coating layer becomes peeled off underwater.

For the above mentioned reasons, the crystal tube of the ultraviolet ray sterilizer should elastically insulate the ultraviolet ray lamps installed in the underwater and should transfer the ultraviolet rays from the ultraviolet ray lamps into the water without any losses, so when coating the titanium dioxide on the crystal tube, the titanium dioxide having a good ultraviolet ray blocking effect is characterized in that most of the ultraviolet rays from the ultraviolet ray lamps are blocked by the photo catalyst. For this reason, it has been prohibited from being coated on the outer surface of the crystal tube adapted in the ultraviolet ray sterilizer.

Consequently, the ultraviolet ray sterilizer used by coating a photo catalyst on the crystal tube like in Korean patent publication number 2004-0056940 is characterized in that thanks to the characteristics of the ultraviolet ray sterilizer configured to sterilize the microorganism underwater by means of the ultraviolet rays radiated into the water by way of the crystal tube as the ultraviolet rays pass one time through the microorganism, the sterilization operation is limitedly performed on the surface of the photo catalyst coated on the outer surface of the crystal tube, so the sterilization effects are greatly lowered, thus resulting in a lowered sterilization efficiency. Though it can provide a crystal tube contamination prevention function, the actual use of the same is not currently performed.

Meanwhile, there is provided an ultraviolet ray sterilizer characterized in that a photo catalyst is coated on a coil type metallic spring carrier, not coating on a crystal tube, and it is filled around the crystal tube into which is inserted the ultraviolet ray lamp. The above-mentioned sterilizer for the sake of drinking water in a temporal piped water facility is awarded a good product certificate (number 2009059) from the public procurement service of Korea.

For the above-mentioned reasons, in the coating method for a crystal tube contamination prevention, it is urgently needed to develop a new photo catalyst coating technology featuring a blocking ratio of the ultraviolet rays that can be controlled by adjusting the thickness of the photo catalyst thin film coated on the outer surface of the crystal tube and coated film that is not peeled off even though it is used for a long time underwater so as to provide a transmission function of ultraviolet rays and a contamination prevention function on the outer surface of the crystal tube so that the ultraviolet ray sterilizer can have a desired sterilization function with the aid of the ultraviolet rays.

SUMMARY

Accordingly, the present invention is made to improve the above mentioned problems, and it is an aspect of the present invention to provide an ultraviolet ray sterilizer for a water pipe and a waterway featuring a plurality of circular flow ways that are formed, and an ultraviolet ray lamp that is positioned at the center of the flow ways, so it is possible to remove the sterilization dead zones where the sterilization is not performed as the ultraviolet rays do not reach the zones.

It is another aspect of the present invention to provide an ultraviolet ray sterilizer for a water pipe and a water way wherein when a photo catalyst having a high ultraviolet ray blocking ratio is coated on a crystal tube surrounding an ultraviolet ray lamp, the sterilization function by means of the ultraviolet rays can be maintained by adjusting the amount of the ultraviolet rays which are blocked by the photo catalyst while preventing organic substances from sticking to the crystal tube, so the machine type crystal tube washing apparatus is not needed.

To achieve the above aspect, there is provided an ultraviolet ray sterilizer for a water pipe and a waterway configured to be connected at a water pipe or a waterway through which a treatment water to be sterilized flows for thereby sterilizing by radiating ultraviolet rays to the treatment water flowing in the ultraviolet ray sterilizer, comprising a housing in which a plurality of cylindrical flow ways connected from an inlet to an outlet are arranged at upper and lower sides in multiple rows, and a pass channel cut-away along a longitudinal direction between neighboring flow ways, and at an upper side of a flow way positioned on the upper most portion is formed an inlet which is open along a longitudinal direction, and the inlet and the outlet are configured to be connected with the water pipe or the water way in such a way to communicate with the water pipe and the water way; a hanger including a cover covering the inlet of the housing, a hanger member extended from an upper side to a lower side as the hanger member is hung on the cover, and a plurality of crystal tubes which each are a long tubular member, an end of which is closed and an end of which is open, and which are arranged matching a row of the plurality of cylindrical flow ways of the housing, the plurality of crystal tubes being supported by the hanger member and the hanger; and an ultraviolet ray lamp including a lamp part inserted into the open end of each crystal tube and a cap part engaged to one end of the lamp part and covering the open end of the crystal tube.

In addition, the hanger includes a blocking member which is supported by the hanger member between neighboring crystal tubes and is positioned at the pass channel so as to block the pass channel of the housing in a state that the plurality of crystal tubes of the hanger are positioned at the centers of the flow ways.

In addition, the hanger includes a titanium dioxide coating layer of a thin film form through which passes ultraviolet rays on an outer surface of the plurality of crystal tubes.

In addition, the ultraviolet ray sterilizer for a water pipe and a waterway according to an embodiment of the present invention features a titanium alkoxide coating liquid diluted with an absolute alcohol solution coated on an outer surface of the crystal tube, and the crystal tube coated with the titanium alkoxide coating liquid solution is heat-treated at a temperature of 350° C.-600° C., thus converting the titanium alkoxide into titanium dioxide.

In addition, the ultraviolet ray sterilizer for a water pipe and a waterway according to an embodiment of the present invention comprises a step in which the titanium alkoxide coating solution is prepared in the form of a photo catalyst sol in such a way that 0.1 mole to 3 mole of diethanolamine as surfactant is added to 15 mol to 40 mol of absolute alcohol as a surfactant for the sake of the smooth conduction of the coating process, and 1 mole to 3 mole of titanium alkoxide is mixed, a step in which a crystal tube coating photo catalyst sol is prepared by diluting the photo catalyst sol with the absolute solution 1 to 3,000 times, and a step in which the photo catalyst sol is coated on the outer surface of the crystal tube and is heat-treated at a temperature of 350° C.-600° C., thus converting titanium alkoxide into titanium dioxide.

In addition, the ultraviolet ray sterilizer for a water pipe and a waterway according to an embodiment of the present invention features the titanium alkoxide coating solution being prepared in such a way to mix 0.1 mol to 3 mol of diethanolamine to 4500 mol to 120,000 mol of ethanol anhydrous without performing a procedure that the photo catalyst sol is diluted, and 1 mol to 3 mol of the titanium alkoxide is mixed.

In addition, the ultraviolet ray sterilizer for a water pipe and a waterway according to an embodiment of the present invention features in that the titanium alkoxide is selected from the group consisting of titanium n-butoxide, titanium tetra-iso-butoxide, titanium-tetra-iso-propoxide, titanium-iso-propoxide and titanium ethoxide.

According to the above described constructions, the ultraviolet ray sterilizer for a water pipe and a waterway according to an embodiment of the present invention features a plurality of circular flow ways are formed, and an ultraviolet ray lamp that is positioned at the center of the flow ways, so it is possible to remove the sterilization dead zones where the sterilization is not performed since the ultraviolet rays don't reach.

The ultraviolet ray sterilizer for a water pipe and a water way according to an embodiment of the present invention features a pass channel connected so that the hanger at which is fixed an ultraviolet ray lamp can come in and go out at the upper and lower sides of the circular flow ways, and when it is needed to exchange the ultraviolet ray lamp or the crystal tube is exchanged in case of the conventional water pipe sterilizer, it is possible to resolve the problems that the crystal tubes are separately attached or detached in such a way that the hanger to which is engaged a crystal tube is attached or detached like the water way type sterilizer, and the water way sterilizer has advantages in that as for the problems that it cannot be applied to the water pipe type sterilizer due to the water level adjustment and the water leakage problem, it is possible to connect to the water pipe by providing a packing member and a fixture by which it is possible to keep an airtight engagement between the upper side of the housing formed of the plurality of the circular water ways and the cover of the upper side of the hanger to which is engaged the crystal tube.

In the ultraviolet ray sterilizer according to an embodiment of the present invention, the ultraviolet ray sterilizer for a water pipe and a waterway features a photo catalyst of the thin film through which ultraviolet rays needed for the sake of the sterilization being coated on the crystal tube surrounding the ultraviolet ray lamp, so the ultraviolet ray sterilizer can provide a sterilization function while preventing organic substances from sticking to the crystal tube, so the machine type crystal tube washing apparatus is not necessary in an embodiment of the present invention.

The ultraviolet ray sterilizer for a water pipe and a waterway according to an embodiment of the present invention is capable of maintaining the microorganism sterilization function with the aid of the transmitting ultraviolet rays by adjusting the amount of the ultraviolet rays to radiate into the water by way of the crystal tube in a method in which the ultraviolet rays control the blocking ratio by adjusting the amount of the photo crystal coated on the surface of the crystal tube while making sure that the contamination prevention function of the crystal tube can be provided.

In other words, the ultraviolet ray sterilizer for a water pipe and a waterway according to an embodiment of the present invention features a plurality of circular flow ways that are formed, and the ultraviolet ray lamp is positioned at the center of the flow ways, so it is possible to remove the sterilization dead zone where sterilization is not performed as the ultraviolet rays don't reach, and it is possible to prevent organic substances from sticking to the crystal tube by coating the photo catalyst on the crystal tube surrounding the ultraviolet ray lamp, and the machine type crystal tube washing apparatus is not needed.

BRIEF DESCRIPTION OF DRAWINGS

FIGS. 1a to 2 are views illustrating an ultraviolet ray sterilizer having a structure that a conventional ultraviolet ray sterilization dead zone is removed.

DETAILED DESCRIPTION

Figure 3:
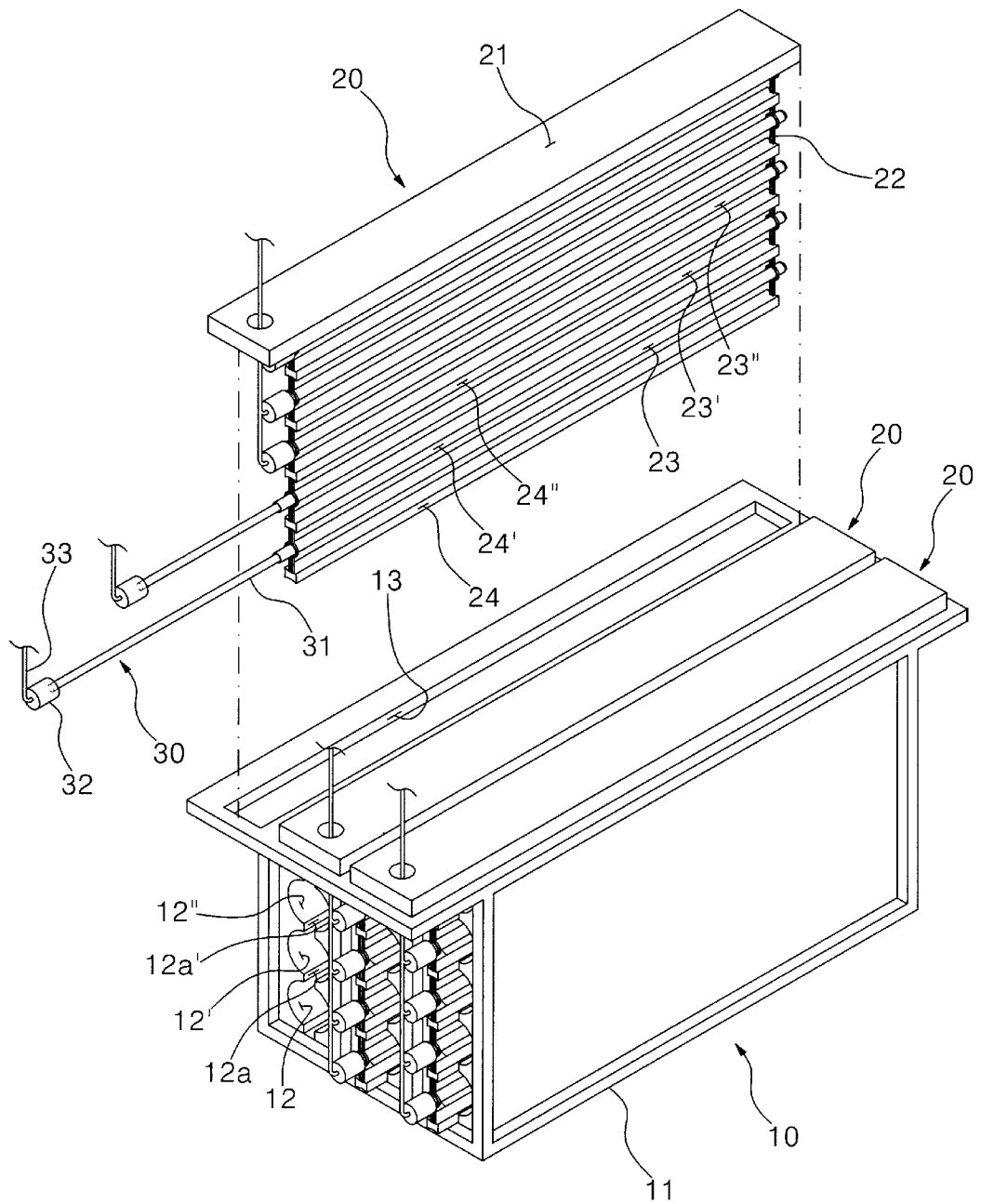
FIG. 3 is a disassembled perspective view illustrating an ultraviolet ray sterilizer for a water pipe and a water way according to an embodiment of the present invention.

The ultraviolet ray sterilizer for a water pipe and a waterway according to the present invention will be described with reference to the accompanying drawings wherein like reference numerals refer to the like elements throughout. The exemplary embodiments are described below to explain the present invention by referring to the figures.

As used in the description of this application, the terms "a", "an" and "the" may refer to one or more than one of an element (e.g., item or act). Similarly, a particular quantity of an element may be described or shown while the actual quantity of the element may differ. The terms "and" and "or" may be used in the conjunctive or disjunctive sense and will generally be understood to be equivalent to "and/or". References to "an" or "one" embodiment are not necessarily all referring to the same embodiment. Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present.

Figure 4:
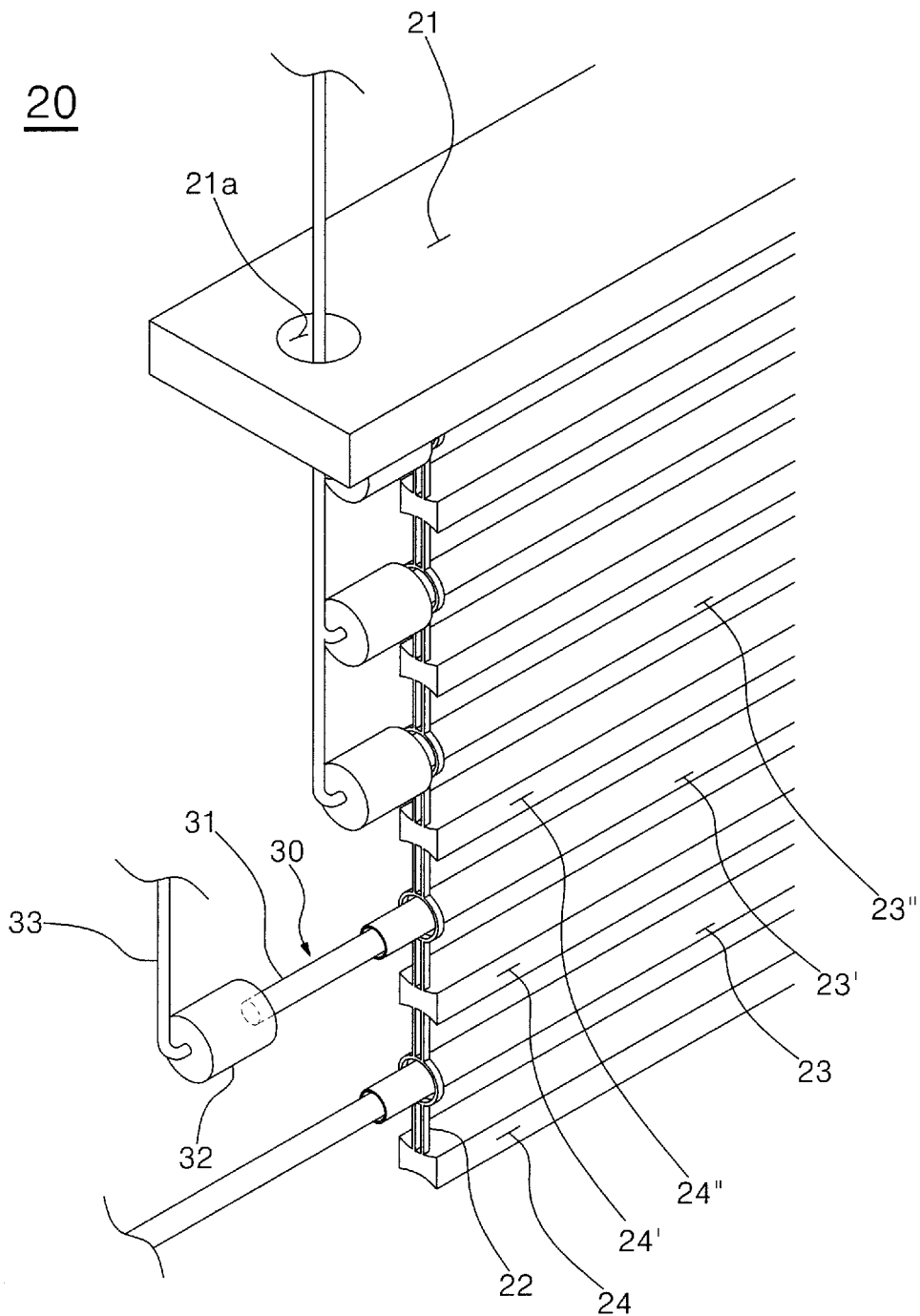
FIG. 4 is an enlarged perspective view illustrating a hanger and an ultraviolet ray lamp of an ultraviolet ray sterilizer for a water pipe and a waterway according to an embodiment of the present invention.
Figure 5:
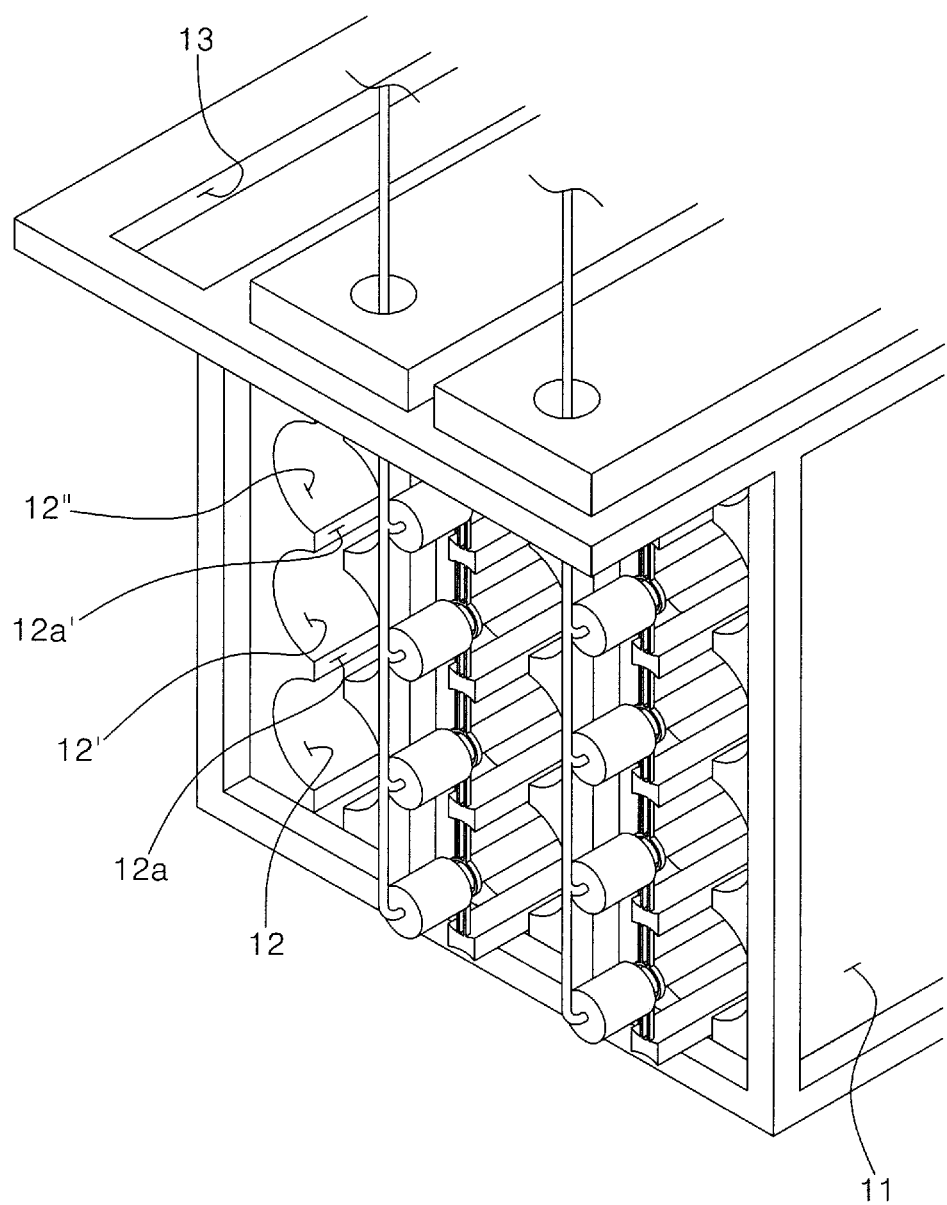
FIG. 5 is an enlarged perspective view illustrating a structure of a housing of an ultraviolet ray sterilizer for a water pipe and a waterway according to an embodiment of the present invention.
Figure 6:
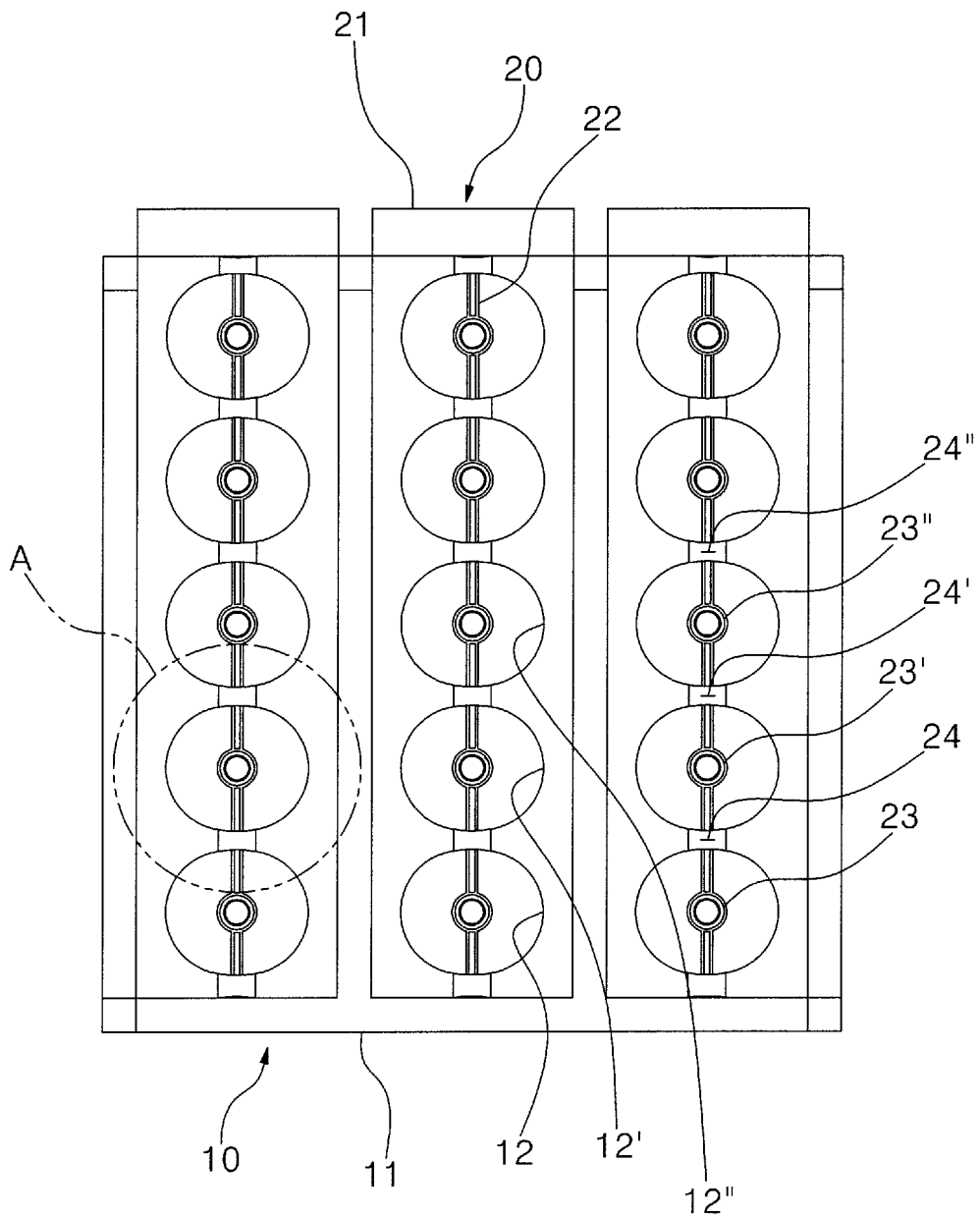
FIG. 6 is a front view illustrating an ultraviolet ray sterilizer for a water pipe and a waterway according to an embodiment of the present invention.
Figure 7:
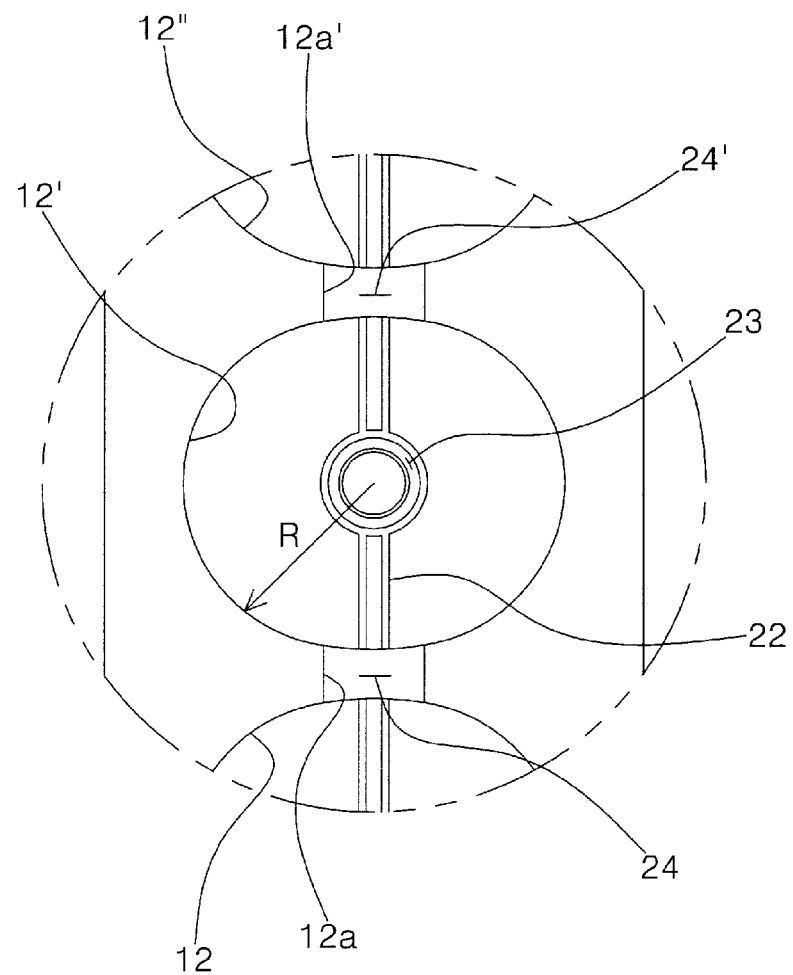
FIG. 7 is an enlarged view of the portion A of FIG. 6.
Figure 8:
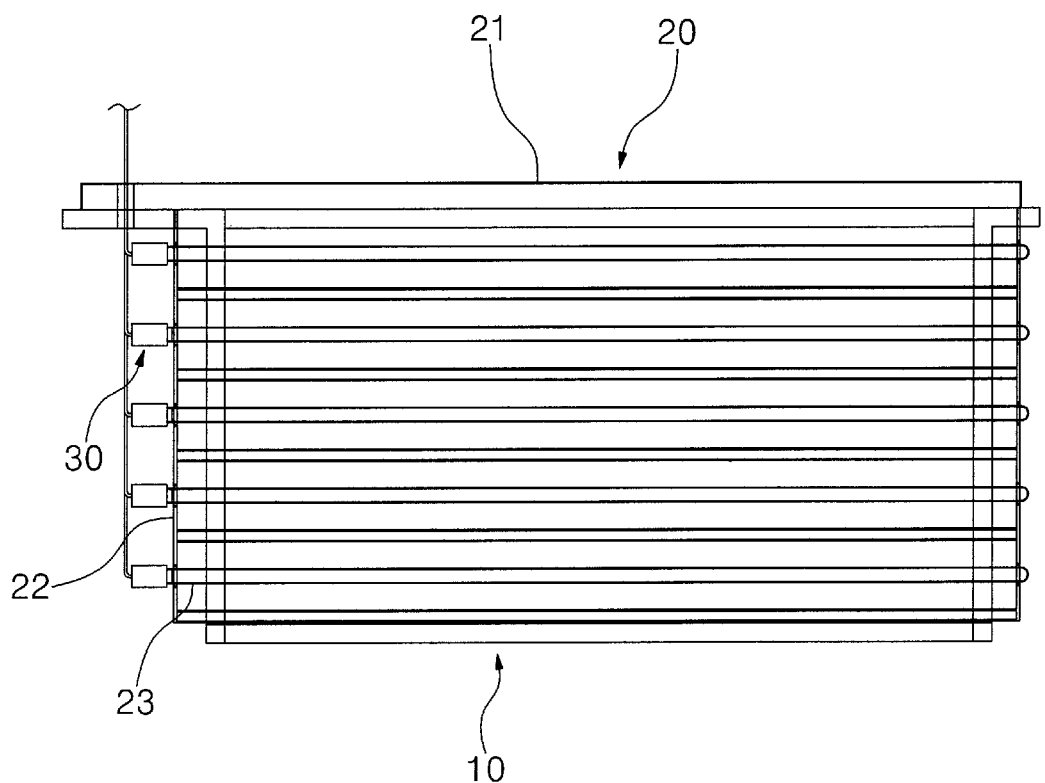
FIG. 8 is a side view illustrating an ultraviolet ray sterilizer for a water pipe and a waterway according to an embodiment of the present invention.

FIG. 3 is a disassembled perspective view illustrating an ultraviolet ray sterilizer for a water pipe and a water way according to an embodiment of the present invention. FIG. 4 is an enlarged perspective view illustrating a hanger and an ultraviolet ray lamp of an ultraviolet ray sterilizer for a water pipe and a waterway according to an embodiment of the present invention. FIG. 5 is an enlarged perspective view illustrating a structure of a housing of an ultraviolet ray sterilizer for a water pipe and a waterway according to an embodiment of the present invention. FIG. 6 is a front view illustrating an ultraviolet ray sterilizer for a water pipe and a waterway according to an embodiment of the present invention. FIG. 7 is an enlarged view of portion A of FIG. 6. FIG. 8 is a side view illustrating an ultraviolet ray sterilizer for a water pipe and a waterway according to an embodiment of the present invention.

As shown in the drawings, the ultraviolet ray sterilizer for a water pipe and a waterway according to an embodiment of the present invention is directed to a sterilizing apparatus which is connected to a water pipe or a waterway in which the treatment water to be sterilized flows, and the treatment water flowing in the same is sterilized by an ultraviolet ray radiated thereto and comprises a housing 10, a hanger 20 and an ultraviolet ray lamp 30.

The housing 10 is connected to a water pipe or a waterway, thus forming a passage through which flows treatment water. An embodiment of the present invention features a passage through which flows treatment water that is formed in the body 11 of the housing 10. In other words, the flow ways 12, 12' and 12" are arranged in multiple rows in the upper and lower sides, and each flow way 12, 12' and 12" is formed in a cylindrical shape, and the ultraviolet rays radiated from the lamp part 31 disposed at the center of the cylindrical profile reach the cylindrical inner surface having a radius smaller than the radius R of the reach of the ultraviolet ray, so a sterilization dead zone where sterilization is not performed as the ultraviolet rays don't reach is prevented. As shown in the drawings, the plurality of the flow ways 12, 12' and 12" are formed in cylindrical shapes extending from the inlet to the outlet, and a plurality of rows are arranged at the upper and lower sides, and the embodiment has a structure that the crystal tubes 24, 24' and 24" into which are inserted the lamp parts 31 can be inserted from the upper side to the lower side into the multiple flow ways 12, 12' and 12". The portions between the neighboring flow ways closer to the flow ways 12, 12' and 12" arranged in multiple rows are cut away long in the longitudinal directions, thus forming the pass channel 12a, 12a' and 12a" which are open at the upper and lower sides, and at the upper side of the flow way positioned at the upper most portion is formed an inlet 13 which is open long toward the upper side of the housing 10 in the longitudinal direction. In an embodiment of the present invention, a plurality of flow ways 12, 12' and 12" are arranged, and the module opened by way of the pass channels 12a, 12a' and 12a" between them are arranged in multiple numbers in the widthwise direction, thus increasing the whole flow rate when the treatment water passes. The flow ways 12, 12' and 12" and the pass channels 12a, 12a' and 12a" are sequentially formed in the upper and lower directions, and the housing at the top of which is formed the inlet 13 communicates with the water pipe or the waterway, so the inlets and the outlets of the flow ways 12, 12' and 12" are connected with the water pipe or the waterway. In addition, when the treatment water fast flows through the flow ways 12, 12' and 12", the flow of the treatment water has a laminar flow. In this case, there might be a difference in the reaching amount of the ultraviolet rays between the near portion and the far portion from the lamp part 31 of the ultraviolet ray lamp 30. So, it is preferred that the flow fluctuating members in protruded structures are formed alternate or spiral shapes so as to produce a turbulent flow by fluctuating the laminar flow at the inner surfaces of the flow ways 12, 12' and 12".

The hanger 20 is directed to a construction in which the crystal tubes 23, 23' and 23" are hung so that the lamp part 31 can be integrally inserted into the crystal tubes 23, 23' and 23" in a state that the lamp part 31 is inserted in the flow ways 12, 12' and 12" of the housing 10 and comprises a cover 21, a hanger member 22, crystal tubes 23, 23' and 23" and blocking members 24, 24' and 24".

The cover 21 is long cut in a longitudinal direction on the upper side of the housing 10 for the purpose of blocking the inlet 13 which is open upward. Since an embodiment of the present invention is directed to a structure which is packed or sealed for the purpose of preventing the water leakage as the cover 21 blocks the inlet 13, so it can be adapted to the water way the upper side of which is open as well as a water pipe. A cable pass hole 21a passes through the cover 21 at an end portion of one side of the cover 21 from the upper side to the lower side for a power cable 33 extended from the lamp part 31 inserted in the crystal tubes 23, 23' and 23" of the hanger 20 to pass. In a state that the power cable 33 passes, the cable pass hole 21a is sealed for preventing the leakage of the treatment water.

The hanger member 22 is a member for hanging the crystal tubes 23, 23' and 23" and the blocking members 24, 24' and 24" at the lower side of the cover 21. As shown in the drawings, the hanger member 22 is long extended from the upper side to the lower side as it is hung on the cover 21. Since the crystal tubes 23, 23' an 23" and the blocking members 24, 24' and 24" have long structures, the hanger members 22 are provided at the end portions of both sides of the cover 21, respectively, so a pair of the hanger members 21 face to each other. The crystal tubes 23, 23' and 23" are tubular members for the purpose of allowing the ultraviolet ray lamps 31 inserted in the interiors of the crystal tubes not to come into direct contact with the treatment water and the ultraviolet rays from the ultraviolet ray lamp 31 to pass. They are arranged at the hanger member 22 at the upper side and the lower side in multiple rows and are hung while matching with the flow ways 12, 12' and 12" of the housing 10. Referring to the drawings, the crystal tubes 23, 23' and 23" are tubular members one side each of which is closed, and the other side of each of which is open and are arranged at upper and lower sides in multiple rows to match with the flow ways 12, 12' and 12" of the multiple rows of the housing 10 and are supported by the hanger member. The lamp parts 31 of the ultraviolet ray lamp 30 are inserted into the interiors of the crystal tubes 23, 23' and 23" which are arranged at the upper and lower sides.

The blocking members 24, 24' and 24" are directed to the construction for the purpose of preventing the treatment water from flowing toward the pass channels 12a, 12a' and 12a" by blocking the pass channels 12a, 12a' and 12a" formed between the flow ways 12, 12' and 12" of the housing 10. An embodiment of the present invention is basically directed to providing a structure in which the flow ways 12, 12' and 12" are formed in the cylindrical shapes, so all the ultraviolet rays from the ultraviolet ray lamps 31 can reach all treatment water flowing in the interiors of the same. When the hanger 20 is input, in the event that the pass channels 12a, 12a' and 12a" which are necessary for the sake of the passes of the crystal tubes 23, 23' and 23" into which are inserted the lamp parts 31 of the ultraviolet ray lamps 30 are not blocked, the ultraviolet rays might not reach the above mentioned portions so that the treatment water can flow toward the pass channels 12a, 12a' and 12a". An embodiment of the present invention features in that the treatment water can flow through only the cylindrical flow ways 12, 12' and 12", not flowing through the pass channels 12a, 12a' and 12a" by blocking the pass channels 12a, 12a' and 12a" with the blocking members 24, 24' and 24". Referring to the drawings, the blocking members 24, 24' and 24" are supported by the hanger member 22 between the neighboring crystal tubes 23, 23' and 23" and are inserted into the pass channels 12a, 12a' and 12a" and are positioned at the pass channels 12a, 12a' and 12a" so as to block the pass channels 12a, 12a' and 12a" of the housing 10 in a state that the crystal tubes 23, 23' and 23" of the hanger 20 are positioned at the center of the flow ways 12, 12' and 12". In the blocking members 24, 24' and 24", the upper and lower side surfaces exposed toward the flow ways 12, 12' and 12" are formed in the curved shapes like the cylindrical inner surfaces of the flow ways 12, 12' and 12" in a state that they are inserted in the pass channels 12a, 12a' and 12a".

The ultraviolet ray lamp 30 is hung on the hanger 20 and is inputted into the housing 10 together with the hanger 20 in an integrated structure. The ultraviolet ray lamps 30 comprise lamp parts 31 inputted into the openings of the crystal tubes 23, 23' and 23", respectively, for thereby radiating ultraviolet rays as the electric power is supplied, a cap part 32 which is capped at an end portion of each lamp part 31 for the purpose of blocking the openings of the crystal tubes 23, 23' and 23" in a state that the lamp parts 31 are inserted in the crystal tubes 23, 23' and 23", and an electric cable 33 which is extended from the cap part 32 and is connected to an external electric power supply apparatus. The ultraviolet ray lamp 30 is integrated with the hanger 20 in a state that the lamp parts 31 are inserted in the crystal tubes 23, 23' and 23", so the crystal tubes 23, 23' an 23" are positioned at the flow ways 12 12' and 12" by way of the inlet 13 of the housing 20 and are inputted into the housing 20 and are engaged, respectively.

Since the treatment water comes into contact in a state that the crystal tubes 23, 23' and 23" are inputted into the flow ways 12, 12' and 12" of the housing 20 as they are hung on the hanger 20, as time passes, organic substances come to stick to the crystal tubes 23, 23' and 23", so the ultraviolet ray transmissivity lowers. In order to prevent the above mentioned problems, it is necessary to periodically clean the outer surfaces of the crystal tubes 23, 23' and 23". However, the present invention features prevention of organic substances from sticking to the surfaces of the crystal tubes 23, 23' and 23" by coating titanium dioxide on the outer surfaces of the crystal tubes 23, 23' and 23" in a thin film form. For the sake of the above operations, an embodiment of the present invention features a titanium dioxide coating layer of a thin film type through which can pass the ultraviolet rays being coated on the outer surfaces of the crystal tubes 23, 23' and 23". As the titanium dioxide is coated on the outer surfaces of the crystal tubes 23, 23' and 23", respectively, organic substances can be prevented from sticking to the outer surfaces of the crystal tubes 23, 23' and 23" with the aid of the photo crystal reaction. The photo crystal reaction is meant that when a light energy higher than the band gap energy is radiated to the photo crystal, positive holes are formed due to the movements of electrons, and the oxidation and degradation reactions occur in the organic substances sticking to the surface of the photo catalyst by means of the strong oxidation power of the OH-radical which generates by means of the positive holes. As for the material for the sake of the above mentioned reactions, titanium dioxide which is safe to acid and alkali material is most well known, so it is widely adapted in various fields.

When the titanium dioxide photo crystal receives ultraviolet rays, the OH-radicals are formed on the surface, and the sterilization operation is performed along with the oxidation of the contaminants. As the affinity with water greatly increases, thus showing a super hydrophilicity, the impurities do not stick to the photo catalyst-coated surfaces. Even when the contaminants stick to the surfaces, they are degraded by the photolysis operation, so the surfaces always remain clean. The photo catalyst is generally coated on the building using the above mentioned characteristics, so that the outer walls of the buildings can automatically cleaned rain or the like, the coating being widely applied in various fields.

Generally, since there is not the functional group such as —OH on the surfaces of the titanium dioxide ($TiO_2$) photo catalyst of particle shapes, it cannot be stuck or coated without a binder such as glass; however a chemical coupling can be performed as water is evacuated when —OH of the binder and —OH of the surface of the glass are condensed during the heat treatment process by using silane binders, and it can be fixedly stuck to the surfaces in a method of fixing the particle shaped photo catalyst between the binders.

In the event that there is a functional group such as a silanol group (—OH) in the substrate to be coated and the material to be coated, they are condensed during the heat treatment and the water is evacuated, so a chemically strong coupling occurs, so a very strong coating membrane can be obtained. It is possible to obtain a stable coating membrane without using a binder in such a way that a glass ball is coated by way of heat treatment with a titanium-iso-propoxide which is a titanium dioxide precursor substance.

In case of the crystal tube, since there is provided $SiO_2$, there is not a functional group of —OH, so even when a heat treatment is performed in such a way to coat a titanium-iso-propoxide which is a titanium dioxide precursor on the crystal tube, a chemical coupling is impossible. So, it is theoretically impossible to produce a stable $TiO_2$ tin film, instead it is easily peeled off. For these reasons, most of the prior arts use a binder for the purpose of coating titanium dioxide.

However, since the titanium dioxide has a strong ultraviolet ray blocking effect, when coating on the crystal tube in a way of using the titanium dioxide as a binder, a desired ultraviolet ray transmissivity cannot be obtained, so it cannot provide a function as a sterilizer.

An embodiment of the present invention allows titanium dioxide to be coated on an outer surface of the crystal tube, and a desired transmissivity of ultraviolet ray can be obtained, the amount of the coating on the crystal tube should be minimum, and the crystal tube generally used for the water treatment apparatus contains much impurities of various positive ions such as Na, Al, Fe, etc., not 100% $SiO_2$. Accordingly, it becomes possible to coat a stable titanium dioxide thin film having a high ultraviolet ray transmissivity on the surface of the crystal tube without using a binder with the aid of the condensing reaction during the heat treatment of the —OH group coupled to the positive ion and the —OH group of the titanium-iso-propoxide of the titanium dioxide precursor substance.

In particular, an embodiment of the present invention features a blocking ratio of the ultraviolet rays radiated from the ultraviolet ray lamp in the interior of the crystal tube being controlled by adjusting the amount of the titanium dioxide coated on the crystal tube and the concentration of the titanium-iso-propoxide which is the titanium dioxide photo catalyst precursor coated on the crystal tube so as to coat while lowering the ultraviolet ray blocking ratio on the crystal tube using a titanium dioxide having a strong ultraviolet ray blocking power as it well absorbs ultraviolet rays.

In case that the ultraviolet rays blocked by the titanium dioxide is less than 3%, the amount of ultraviolet rays transmitted is much, and the decrease in the sterilization is small, and the function of the crystal tube contamination function by the photo catalyst might not be enough. On the contrary, when the ultraviolet rays are blocked much, the contamination prevention function might work well, but the ultraviolet rays transmitted may be small, and the sterilization efficiency might be low. In addition, when the photo catalyst is coated so that the ultraviolet ray blocking ratio is higher than 50%, the contamination prevention function of the crystal tube might be enough; however the amount of the ultraviolet rays transmitting underwater is small, so the natural functions of the sterilizer might decrease due to the low sterilization power. It is preferred that the photo catalyst is coated to the extent that 3-10% of ultraviolet rays can be blocked.

It is the most ideal that the titanium dioxide molecules are uniformly coated on the surface of the crystal tube; however since it is impossible to adjust, it is crucial to coat one molecular layer to a couple molecular layers. Since the photo catalyst reaction is performed only on the surface to which is radiated light, the contaminant substance removing function is not enhanced even though the coating layer becomes thick as the blocking of the ultraviolet ray increases, so it is crucial to adjust the thickness of the coating layer.

In order for the crystal tube to have the contamination prevention function and the sterilization function with the aid of ultraviolet rays, the titanium alkoxide such as titanium-iso-propoxide, titanium ethoxide, titanium butoxide, etc. which are precursors of the titanium dioxide photo catalyst is diluted with the ethanol anhydrous ethanol and propanol which are used as solvent, so the blocking ratio of the ultraviolet rays from the ultraviolet ray lamps in the interior of the crystal tubes can be controlled up to 0-99.99% by adjusting the amount of the photo catalyst coated on the crystal tube.

In order to adjust the thickness of the photo catalyst coating layer coated on the surface of the crystal tube, in the event that a conventional dip method is used, it is possible to somehow adjust the thickness of the coating layer after the heat treatment; however the above mentioned method has a limit in adjusting the thickness of the coating layer since the coating amount changes depending on the speed that the crystal tube rises in the coating liquid and the temperature of the coating room.

In case that the particle shaped photo catalyst and the binder disclosed in the prior arts are used, even when the coating is performed by the dip method and the spray method, since it is impossible to adjust the blocking ratio of the ultraviolet rays up to the lower levels of 3-10% depending on the thickness of the photo catalyst particle and the thickness of the coating layer configured to surround and fix the photo catalyst with a binder, the blocking effects of the ultraviolet rays of coated titanium dioxide are too big to use as the ultraviolet ray sterilizer.

In order to minimize the loss of sterilization power by ultraviolet rays and to achieve contamination prevention of the crystal tube, an embodiment of the present invention is directed to obtaining a titanium dioxide coating layer of a thin film having an ultraviolet ray blocking ratio of 3-30% in such a way that the photo crystal sol dedicated to the coating of the crystal tube prepared by diluting up to 5-1000 times using the ethanol anhydrous solvent without directly using the titanium dioxide photo catalyst sol generally used for the sake of the photo catalyst reaction is uniformly coated on the surface of the crystal tube and is dried and heat-treated in a dip coating method.

The process in which titanium dioxide is coated on the crystal tube in a thin film shape will be described in detail.

In order to prepare the titanium dioxide photo catalyst sol, ethanol-iso-propoxide:diethanolamine are mixed at a mole ratio of 15-40:1-3:0-3. Ethanol is inputted into 15-40 mole of the container, and the diethanolamine of 0-3 moles inputted, and then they are well mixed. Afterward, titanium-iso-propoxide of 1-3 mole is mixed and agitated, thus preparing titanium dioxide photo catalyst sol and it is sealed and stored.

According to an embodiment of the present invention, in terms of the titanium dioxide having a low ultraviolet ray transmission power, in order to achieve the objects of the water treatment apparatus using ultraviolet rays with the aid of the titanium dioxide photo catalyst featuring in that the ratio of the blocking of the ultraviolet greatly increases as the coating layer become ticker, an embodiment of the present invention is directed to preparing the crystal tube coated with an ultra thin film type titanium dioxide having 70-97% of the ultraviolet ray transmissivity. In the present invention, it is possible to adjust the amount (thickness) of the titanium dioxide coated on the crystal tube after it is heat-treated by adjusting the concentration of the titanium-iso-propoxide in the photo catalyst sol by diluting the photo catalyst sol with alcohol solvent.

So as to coat the titanium dioxide in a form of ultra thin films, the photo catalyst sol dedicated to the crystal tube coating for the sake of the contamination prevention using the ethanol anhydrous solvent (ethanol) up to 5-1000 times with respect to the titanium dioxide catalyst sol, and in order for the water treatment apparatus using ultraviolet rays to have the uniform sterilization and contamination prevention function, one end of the crystal tube is closed, and the crystal tube is inputted into the container with the photo catalyst sol dedicated to the crystal tube coating, and the crystal tube is raised out of the container at the same speed or the photo catalyst sol dedicated to the crystal tube coating is discharged at a certain speed by way of the outlet of the lower side of the container, so the photo catalyst dedicated to the coating of the crystal tube can be uniformly coated.

The crystal tube coated with the photo catalyst sol dedicated to the coating of the crystal tube is dried at a temperature ranging from a room temperature to 80° C. for 5-60 minutes, and it is heat-treated for 30 minutes to 3 hours at a temperature of 350-600° C. in the electric furnace, so it is possible to prepare the crystal tube coated with various ultra thin film type titanium dioxide having 0-99.99% of ultraviolet ray transmissivity. The present invention features in that it is possible to prepare a coating layer of an ultraviolet ray transmissivity of 70-97% in consideration of the impurity sticking prevention function on the outer surface of the crystal tube with the aid of the sterilization function by means of ultraviolet rays and the titanium dioxide coating layer.

In an embodiment of the present invention, the inconvenience occurring when manufacturing a measurement test piece by cutting the crystal tube so as to measure the thickness of the titanium dioxide thin film on the surface of the crystal tube for the sake of the quality control of the crystal tube coating process and the problems occurring when obtaining an interrelationship with the ultraviolet ray transmissivity from the measured thickness of the titanium dioxide can be overcome in such a way that the ultraviolet ray transmissivity before and after the coating of the titanium dioxide photo catalyst is measured using the ultraviolet ray photometer (manufactured by DELTA OHM company, Model Number HD 9021), so it can be assumed that the crystal tube having a UV-C transmissivity of 70-90% (ultraviolet ray blocking ratio is 3~30%) can be adapted to the ultraviolet ray sterilizer.

In terms of the titanium dioxide photo catalyst sol, it is possible to adjust the amount of the titanium dioxide coated on the crystal tube in such a way to dilute various types of ethanol anhydrous up to 5-1000 times using a solvent such as absolute ethanol, propanol, etc. As a dilution solvent, it is preferred to use the same kinds of alcohols used when preparing the titanium dioxide photo catalyst sol because it can be uniformly mixed during dilution.

The method for measuring the ultraviolet ray transmissivity before and after the coating with respect to the crystal tube on which is coated a titanium dioxide photo catalyst using the ultraviolet ray photometer features the ultraviolet ray lamp being inputted into the interior of the crystal tube, and the crystal tube being fixed at the center in the pipe having the diameter and length longer than the crystal tube in consideration of the safety of the measurer and it should be cared so that the ultraviolet rays are not exposed to the outside. The ultraviolet ray transmissivity of the crystal tube is measured in such a way to measure the intensity of the ultraviolet rays using the photometer with respect to the ultraviolet rays inputted via the ultraviolet ray intensity measurement hole formed at the intermediate portion of the lamp in the ultraviolet ray lamp filament.

Specific embodiments of the present invention will be now be described in more detail. It is noted that the following embodiments are provided for the purpose of describing in detail the present invention, not limiting the scope of the present invention by means of the disclosed embodiments.

Embodiment 1

In order to prepare the photo catalyst sol, 1000 ml of Ethanol Anhydrous is inputted into the agitation-possible container sealed from the outside air, and 50 ml of Diethanolamine is dropped, thus mixing it for 30 minutes, and 150 ml of Titanium-iso-propoxide is slowly dropped for about 1-3 hours and is mixed, thus preparing a titanium dioxide photo catalyst sol.

In order to coat the photo catalyst sol on the crystal tube, ethanol anhydrous of 5 to 1000 times with respect to the amount of the photo crystal sol is added and well mixed, thus preparing the photo catalyst sol dedicated to the coating of the crystal tube. The photo catalyst sol dedicated to the coating of the crystal tube is filled by as much as the length of the crystal tube to be coated, into the cylindrical container having the length and diameter greater than the length and diameter of the crystal tube, and the crystal tube is raised at 1 m/sec, thus coating the outer surface of the crystal tube.

The crystal tube coated in the above method is dried at 80° C. for 30 minutes, and is heat-treated at 450° C. for 2 hours.

The photo catalyst sol dedicated to the coating of the crystal tube prepared by diluting the titanium dioxide photo catalyst sol with ethanol at a certain ratio by the methods is coated on the crystal tube and is heat-treated, and the transmissivity measured using the ultraviolet ray photometer is shown in Table 1. Table 1 shows the ultraviolet ray transmissivity based on the multiple of the dilution of the titanium dioxide photo catalyst sol.

TABLE 1

| | Dilution multiple of titanium dioxide photo catalyst sol | | | | | | |
|---|---|---|---|---|---|---|---|
| | 1000 | 330 | 200 | 100 | 50 | 20 | 10 | 5 |
| transmissivity (%) | 96 | 86 | 70 | 63 | 47 | 33 | 21 | 4 |

Embodiment 2

Not performing the procedure that the titanium dioxide photo catalyst sol is prepared and is diluted with an alcohol solvent, and the photo catalyst sol dedicated to the coating of the crystal tube, this embodiment is directed to directly preparing a photo catalyst sol dedicated to the coating of the crystal tube, in which 1000 liter of Ethanol Anhydrous is inputted into the agitation-possible container which is sealed from the outside air, and 50 ml of Diethanolamine is dropped and mixed for 30 minutes, and 150 ml of Titanium-iso-propoxide is slowly dropped into the mixed solution for about 1-3 hours and is mixed, thus preparing the photo catalyst sol dedicated to the coating of the crystal tube.

In order to coat the photo catalyst sol dedicated to the coating of the crystal tube on the crystal tube, the photo catalyst sol dedicated to the coating of the crystal tube is inputted, by as much as the length of the crystal tube to be coated, into the cylindrical container having the length and diameter greater than the length and diameter of the crystal tube, and the crystal tube is raised at a speed of 1 meter/min, thus coating on the outer surface of the crystal tube.

The crystal tube coated in the above method is dried for 30 minutes at a temperature of 80° C. and is heat-treated at 450° C. for 2 hours.

Since the present invention is directed to obtaining a hydrophobic function by coating a photo catalyst having a low ultraviolet ray transmissivity on the crystal tube and a crystal tube contamination prevention function by way of the photo catalyst reaction by which to degrade the contaminants sticking to the crystal tube. In addition, an embodiment of the present invention is directed to achieving the objects of the sterilizer by radiating the ultraviolet ray from the ultraviolet ray lamp into the underwater, so the adjusting of the amount of titanium dioxide coated on the crystal tube is very important.

According to an embodiment of the present invention, in case that the titanium dioxide photo catalyst sol is diluted 1000 times, 96% of the ultraviolet ray transmissivity is obtained, but when diluting 5 times, the ultraviolet ray is blocked, so the crystal tube for the sake of the water treatment apparatus using ultraviolet rays is preferred to be determined to have a range of 1000 times to 200 times in consideration of the sterilization efficiency. It is preferred that the titanium dioxide photo catalyst sol is diluted 1000 times to 500 times, so it can be coated on the crystal tube.

According to an embodiment of the present invention, the method for directly preparing the photo catalyst sol dedicated to the coating of the crystal tube is possible, but as the advantages obtained when preparing the photo catalyst sol dedicated to the coating of the crystal tube by way of the procedure of diluting the titanium dioxide photo catalyst sol, it is easy to adjust the contents of the titanium dioxide, and it is possible to prepare the photo catalyst dedicated to the coating of the crystal tube any time when it is necessary.

According to an embodiment of the present invention, the substance used as the precursor of the titanium dioxide might be any of compounds of titanium alkoxides such as titanium-iso-propoxide, titanium butoxide, etc. Here, titanium-iso-propoxide is preferred.

The ultraviolet ray sterilizer for a water pipe and a waterway described so far and shown in the drawing is only exemplary for implementing the present invention, and it should not be interpreted as a means for limiting the technical concepts of the invention. As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims and their equivalents, and therefore all changes and modifications that fall within the meets and bounds of the claims, or equivalents of such meets and bounds are therefore intended to be embraced by the appended claims.

The invention claimed is:

1. An ultraviolet ray sterilizer for a water pipe and a waterway configured to be connected at the water pipe or a waterway through which a treatment water to be sterilized flows for thereby sterilizing by radiating ultraviolet rays to the treatment water flowing in the ultraviolet ray sterilizer, comprising:

a housing having an upper side and a lower side in which a plurality of cylindrical flow ways connected from an inlet to an outlet are arranged at upper and lower sides in multiple rows, and a pass channel cut-away along a longitudinal direction between neighboring flow ways, and at an upper side of an upper flow way is formed an opening which is open along a longitudinal direction of the housing, and the inlet and the outlet are configured to be connected with the water pipe or the water way in such a way to communicate with the water pipe and the water way;

a hanger including a cover covering the opening of the housing, a hanger member extended from an upper side to a lower side as the hanger member is hung on the cover, and a plurality of crystal tubes which each are a tubular member, an end of which is closed and an end of which is open, and which are arranged matching a row of the plurality of cylindrical flow ways of the housing, the plurality of crystal tubes being supported by the hanger member; and an ultraviolet ray lamp including a lamp part inserted into the open end of each crystal tube and a cap part engaged to one end of the lamp part and covering the open end of the crystal tube.

2. The sterilizer of claim 1, wherein the hanger includes a blocking member which is supported by the hanger member between neighboring crystal tubes and is positioned at the pass channel so as to block the pass channel of the housing in a state that the plurality of crystal tubes of the hanger are positioned at centers of the flow ways.

3. The sterilizer of claim 2, further comprising a titanium dioxide coating layer of a thin film formed through which passes ultraviolet rays on an outer surface of the plurality of crystal tubes.

4. The sterilizer of claim 1, further comprising a titanium dioxide coating layer of a thin film formed through which passes ultraviolet rays on an outer surface of the plurality of crystal tubes.

* * * * *